US012240082B2

(12) United States Patent
Stickley

(10) Patent No.: US 12,240,082 B2
(45) Date of Patent: Mar. 4, 2025

(54) HYDRAULIC TORQUE WRENCH AND CONTROL SYSTEM FOR A HYDRAULIC TORQUE WRENCH

(71) Applicant: Enerpac UK Ltd, Northumberland (GB)

(72) Inventor: Craig Ian Stickley, Blaydon Tyne and Wear (GB)

(73) Assignee: Enerpac UK Ltd, Morpeth (GB)

( * ) Notice: Subject to any disclaimer, the term of this patent is extended or adjusted under 35 U.S.C. 154(b) by 408 days.

(21) Appl. No.: 17/625,999

(22) PCT Filed: Jul. 13, 2020

(86) PCT No.: PCT/GB2020/051683

§ 371 (c)(1),
(2) Date: Jan. 10, 2022

(87) PCT Pub. No.: WO2021/009500

PCT Pub. Date: Jan. 21, 2021

(65) Prior Publication Data

US 2022/0250214 A1 Aug. 11, 2022

(30) Foreign Application Priority Data

Jul. 12, 2019 (GB) ..................................... 1910033

(51) Int. Cl.
*B25B 21/00* (2006.01)
*B25B 23/145* (2006.01)

(52) U.S. Cl.
CPC ........ *B25B 21/005* (2013.01); *B25B 23/1456* (2013.01)

(58) Field of Classification Search
CPC ....... B25B 13/00; B25B 21/00; B25B 21/002; B25B 21/005; B25B 21/008; B25B 23/14;
(Continued)

(56) References Cited

U.S. PATENT DOCUMENTS 3,230,713 A * 1/1966 McDurmont ...... H01R 43/0427 91/468
4,791,838 A * 12/1988 Bickford ............... B25B 23/145 73/761
(Continued)

FOREIGN PATENT DOCUMENTS

DE 102011013926 A1 9/2012
DE 102017112481 * 4/2018
(Continued)

OTHER PUBLICATIONS

Office Action issued from the United Kingdom Patent Office for related Application No. GB1910033.8 dated Aug. 8, 2022 (5 Pages).
(Continued)

*Primary Examiner* — Robert J Scruggs
(74) *Attorney, Agent, or Firm* — Andrus Intellectual Property Law, LLP

(57) ABSTRACT

A hydraulic torque wrench comprises a ratchet link, a power head, and a signal carrying connector for connection to a controller. The ratchet link includes a housing and a drive plate mounted for rotation about an axis within the housing, the drive plate mounting one part of a first part of a ratchet drive. A socket is mounted for rotation within the housing, the socket providing a second part of the ratchet drive. During rotation of the drive plate in one direction the first and second part of the ratchet drive engage each other to cause rotation of the socket with the drive plate and during rotation of the drive plate in a second direction one of the first and second parts of the ratchet drive rides over the other such that the socket remains stationary while the drive plate rotates. The power head includes a piston and cylinder and hydraulic connections adapted for connection to a source of pressurised hydraulic fluid. The torque wrench mounts a proximity sensor connected to the signal carrying connector and configured to detect maximum extension of the piston.
(Continued)

When maximum extension of the piston is detected the proximity sensor emits an electrical signal.

20 Claims, 6 Drawing Sheets

(58) Field of Classification Search
CPC .............. B25B 23/145; B25B 23/1453; B25B 23/1456; B25B 13/46; B25F 5/02; B25F 5/005
See application file for complete search history.

(56) References Cited

U.S. PATENT DOCUMENTS

| | | | | |
|---|---|---|---|---|
| 7,520,128 | B1 * | 4/2009 | Rosa | B25B 23/145 81/470 |
| 10,583,543 | B1 * | 3/2020 | Tiskevics | B25B 23/1453 |
| 2014/0165790 | A1 | 6/2014 | Neiss et al. | |
| 2018/0202247 | A1 * | 7/2018 | Johnson | E21B 21/106 |

FOREIGN PATENT DOCUMENTS

| | | | | |
|---|---|---|---|---|
| EP | 151826 | A2 | | 11/2001 |
| EP | 1151826 | A2 | | 11/2001 |
| JP | H11114846 | | | 4/1999 |
| JP | H11114846 | A | | 4/1999 |
| RO | 126383 | | * | 6/2011 |
| RO | 126383 | A2 | * | 6/2011 |
| WO | WO 02102554 | | * | 12/2002 |
| WO | 2017060777 | A2 | | 4/2017 |
| WO | WO 2017/060777 | | * | 8/2017 |

OTHER PUBLICATIONS

Office Action issued from the United Kingdom Patent Office for related Application No. GB1910033.8 dated Apr. 5, 2023.
International Search Report with Written Opinion for related Application No. PCT/GB2020/051683 dated Dec. 23, 2020 (10 Pages).

* cited by examiner

HYDRAULIC TORQUE WRENCH AND CONTROL SYSTEM FOR A HYDRAULIC TORQUE WRENCH

FIELD OF THE INVENTION

The present invention relates to a hydraulic torque wrench and in particular to a control system for powering and controlling the operation of a hydraulic torque wrench.

BACKGROUND OF THE INVENTION

Torque wrenches are used in many situations for tightening and slackening fasteners including nuts, bolts and screws. Typically, the hydraulic torque wrench is operated by a person controlling a valve. When the valve is configured to allow pressurised hydraulic fluid to move through the hydraulic torque wrench, a piston is caused to move by the pressurised hydraulic fluid until the piston reaches the end of its stroke. The operator configures the valve, for example by releasing lever, to de-pressurise the hydraulic fluid behind the piston. A spring then causes the piston to return to its retracted state. A ratchet mechanism in the hydraulic torque wrench allows the lever to follow the piston to a start position. The process of introducing pressurised hydraulic fluid into the cylinder behind the piston and releasing the hydraulic pressure to allow the piston and lever to return the start position is repeated until the operator considers the bolt to be tightened to the desired torque. The may include observing whether the faster is moving for example.

Where the magnitude of the torque is critical, for example in aircraft applications, a torque indicator may be provided so that the operator can continue to tighten the fastener until the desired torque is reached. The torque indicator may be a hydraulic pressure gauge. Torque may be correlated to hydraulic fluid pressure. Where such an apparatus is provided the operator cycles the hydraulic torque wrench until the hydraulic fluid pressure reaches an indicated threshold, and the fastener is observed not to move.

The above described apparatus requires the operator to look at objects in two different positions, namely the hydraulic torque wrench and fastener to which it is attached and the hydraulic pressure monitor. Furthermore, it is possible that the fastener will not be tightened to the desired torque. The fastener may be over tightened or under tightened simply because it is difficult for the operator to cease tightening at the exact desired hydraulic fluid pressure.

It would be desirable to provide an improved hydraulic torque wrench and an improved apparatus for operating and controlling such a hydraulic torque wrench.

SUMMARY OF THE INVENTION

According to a first aspect of the invention there is provided a hydraulic torque wrench comprising a ratchet link, a power head, and a signal carrying connector for connection to a controller, wherein the ratchet link includes a housing and a drive plate mounted for rotation about an axis within the housing, the drive plate mounting one part of a first part of a ratchet drive, and wherein a socket is mounted for rotation within the housing, the socket providing a second part of the ratchet drive, wherein during rotation of the drive plate in one direction the first and second part of the ratchet drive engage each other to cause rotation of the socket with the drive plate and during rotation of the drive plate in a second direction one of the first and second parts of the ratchet drive rides over the other such that the socket remains stationary while the drive plate rotates, and wherein the power head includes a piston, a cylinder and hydraulic connections adapted for connection to a source of pressurised hydraulic fluid, and wherein the torque wrench mounts a proximity sensor connected to the signal carrying connector and configured to detect maximum extension of the piston, and wherein when maximum extension of the piston is detected the proximity sensor emits an electrical signal.

The proximity sensor may be mounted in a wall of the housing and wherein when the piston is at its maximum configuration a surface of the drive plate is directly adjacent the proximity sensor and the proximity sensor sense the presence of the drive plate.

The piston may have a top surface and bottom surface, the cylinder includes a first port for introducing pressurised fluid in to the space defined by the walls of the cylinder and the top surface of the piston and a second port for introducing pressurised hydraulic fluid into the space defined by the walls of the cylinder and the bottom surface of the piston for extension and retraction of the piston under pressure.

Preferably, the piston is attached to the drive plate by attachment means, wherein the attachment means is adapted to take up relative movement between the piston and the drive plate as the piston moves linearly and the drive plate rotates.

The attachment means may include a pin and a slot.

The hydraulic torque wrench may further comprise an electronic identifier programmed with information selected from the group comprising: tool serial number; tool type; required tool operating pressure; and pressure torque ratio (the value at which when multiplied by the pressure, the torque applied is calculated).

The electronic identifier may be a micro chip.

According to a second aspect of the invention there is provided a combination comprising a hydraulic torque wrench according to the first aspect of the invention and a hydraulic power pack configured to generate pressurised hydraulic fluid and connected hydraulically to the hydraulic connections of the power head for delivering pressurised hydraulic fluid to the power head and for receiving hydraulic fluid from the power head, wherein the hydraulic power pack includes an electronic controller and wherein the signal carrying connector is connected to the electronic controller, and wherein upon receiving a changed signal from the proximity sensor the electronic controller causes the direction of flow of pressurised hydraulic fluid to be reversed.

Preferably, the hydraulic power pack is configurable such that the hydraulic fluid pressure is matched to the hydraulic fluid pressure of the connected hydraulic torque wrench.

Advantageously, the hydraulic torque wrench further comprises an electronic identifier programmed with information selected from the group comprising: tool serial number; tool type; required tool operating pressure; and pressure torque ratio (the value at which when multiplied by the pressure, the torque applied is calculated) and the electronic controller reads the identifying information from the electronic identifier and sets the hydraulic fluid pressure to match the requirements of the identified hydraulic torque wrench.

The combination may further comprise a hand operated control device for controlling the flow of pressurised hydraulic fluid pressure to the power head.

The hand operated control device may include an on/off switch, wherein in the on position pressurised hydraulic fluid flows to the power head and in the closed position pressurised hydraulic fluid does not flow to the power head.

The hand operated control device may include an indicator indicating that the required torque has been reached.

The piston of the power head may be cycled between extended and retracted positions until the electrical signal from the proximity sensor does not change.

The combination may further comprise a data logger, the data logger configured to record one or more of: the torque applied when the electrical signal from the proximity sensor does not change (the last torque applied); pressure achieved; the identifying information of the hydraulic torque wrench; the time and date; the operator; identifying information associated with the object the hydraulic torque wrench is being used on.

The combination may further comprise a human machine interface.

Preferably, the data logger and/or the human machine interface are located in the hydraulic power pack.

The hydraulic power pack may include a hydraulic pressure sensor and wherein the electronic controller is configured to increase the duty cycle fo the hydraulic pump if the sensed hydraulic fluid pressure is less than the hydraulic fluid pressure required by the connected hydraulic torque wrench.

Preferably, the hydraulic power pack includes a hydraulic fluid cooler.

Advantageously, the hydraulic power pack includes a hydraulic fluid temperature sensor, the hydraulic fluid cooler includes a fan and wherein the fan is switched on when the sensed temperature exceeds a threshold temperature.

BRIEF DESCRIPTION OF THE DRAWINGS

In the Drawings, which illustrate preferred embodiments of the invention, and are by way of example.

DETAILED DESCRIPTION OF THE PREFERRED EMBODIMENTS

Figure 1:
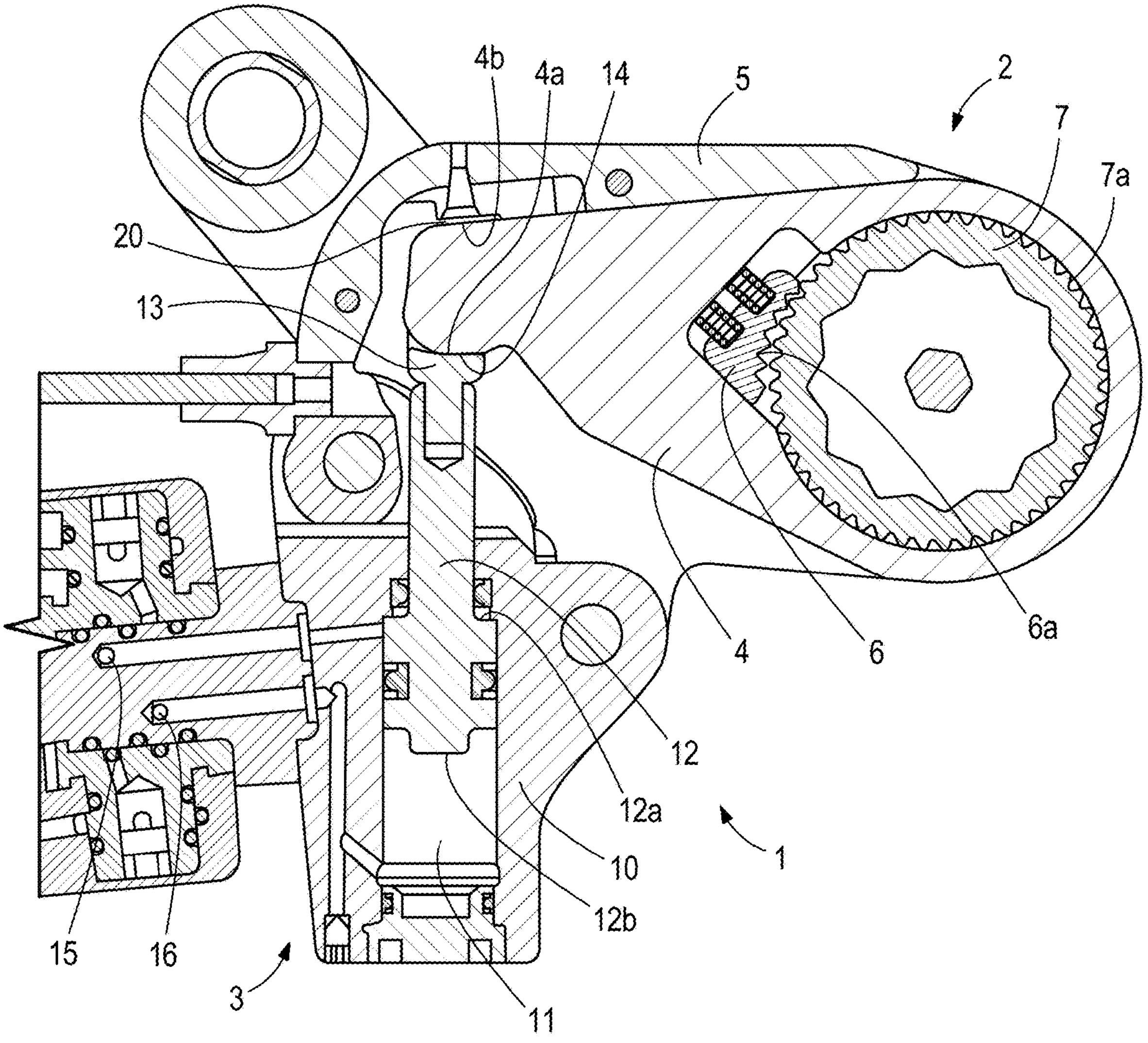
FIG. 1 is a cross-sectional elevation through a hydraulic torque wrench.

Referring now to FIG. 1, the hydraulic torque wrench 1 comprises two parts, a ratchet link 2 and a power head 3.

The ratchet link 2 includes a housing 5 and a drive plate 4 mounted in the housing 5. The drive plate 4 mounts a ratchet drive pawl 6, the drive pawl 6 having a series of teeth 6*a*, which engage with external teeth 7*a* of a socket 7 when the drive plate 4 rotates in a clockwise direction. When the drive plate 4 is rotated counter clockwise the respective angles of the surfaces of teeth 6*a*, 7*a* cause the teeth 6*a* of pawl 6 to ride over the teeth 7*a* of socket 7.

The power head 3 includes a housing 10 in which a cylinder 11 is formed. A piston 12 is mounted in the cylinder 11. The piston 12 mounts a piston head 13 which has a curved surface 14. The curved surface 14 engages with a corresponding curved surface 4*a* of the ratchet lever 4. The curved surfaces 14, 4*a* provide for relative movement between the piston head 13 and drive plate 4 as the piston moves linearly and the drive plate 4 rotates.

Figure 2:
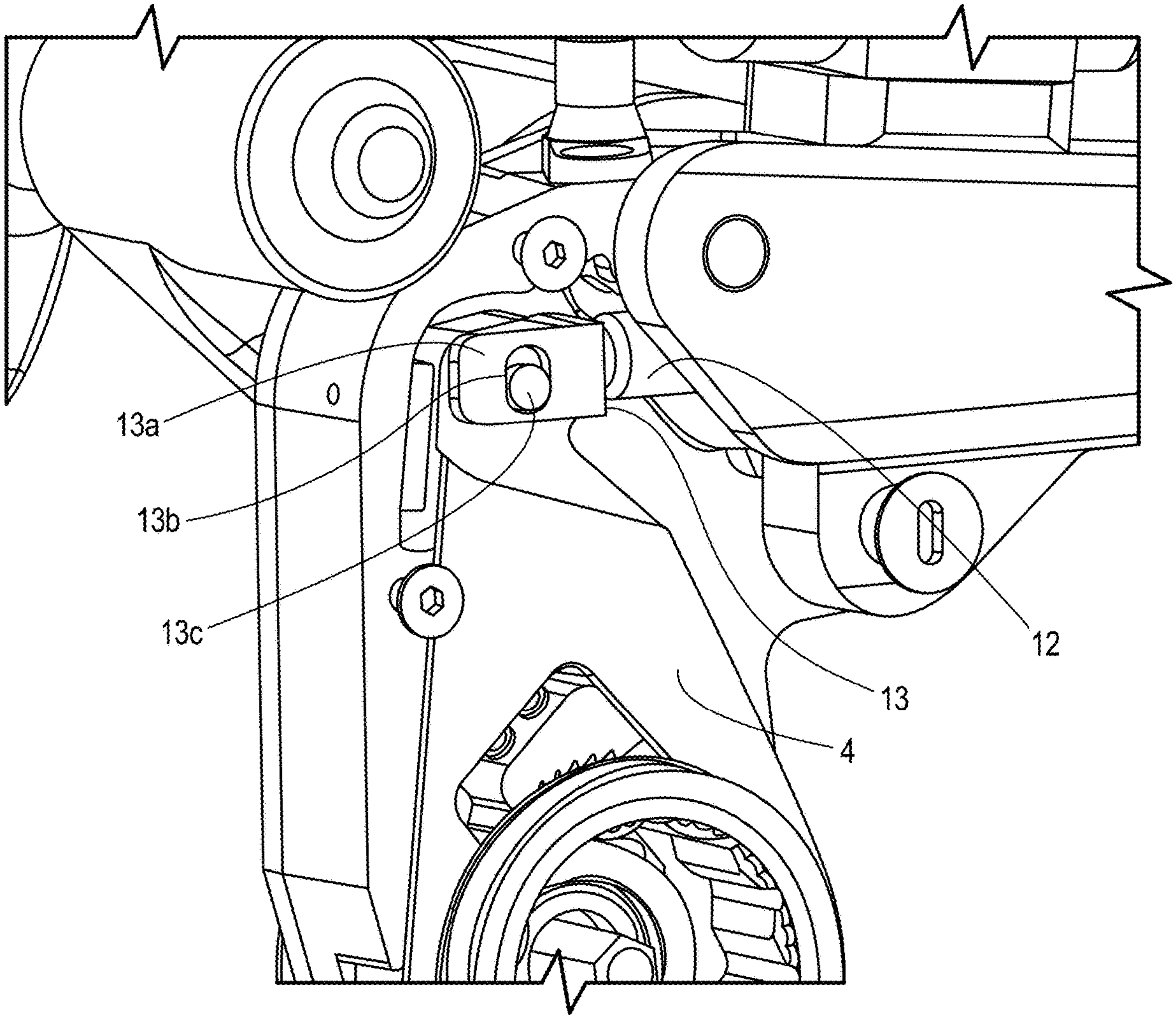
FIG. 2 is a schematic representation of the hydraulic torque wrench illustrated in FIG. 1 from the reverse side.

FIG. 2 shows the revers side of the ratchet link 2 and power head 3. It can be seen from this drawing that the piston head 13 includes plate 13*a* which extends behind the ratchet lever 4. The plate 13*a* includes a slot shaped opening 13*b*. A pin 13*c* passes through the slot 13*b* and is attached to the ratchet lever 4. The slot takes up the differential movement between the piston 12 and the ratchet lever 4 as the piston moves linearly and the ratchet lever rotates.

The cylinder 11 has two hydraulic fluid ports 15, 16, the port 15 provides for the passage of hydraulic fluid into the space between the top surface 12*a* of piston 12 and the cylinder 11. The port 16 provides for the passage of hydraulic fluid into the space defined by the bottom surface 12*b* of the piston 12 and the walls of cylinder 11.

A proximity sensor 20 is mounted in the wall of housing 5 such that when the piston 12 is in its fully extended configuration the surface 4*b* of the drive plate 4 is directly adjacent the proximity sensor 20.

The function of the proximity sensor 20 is to detect the presence of the drive plate 4. As the drive plate 4 approaches the position shown in FIG. 1 the electronic signal emitted by the proximity sensor 20 changes, indicating that the maximum extension of the piston 12 has been reached. The electronic signal from the proximity sensor is used to reverse the flow of hydraulic fluid in the bores 15, 16. Hydraulic fluid is caused to flow into the port 15, filling the space defined by the top surface 12*a* of the piston 12 and the walls of cylinder 11. At the same time, hydraulic fluid is forced out of the space defined by the bottom surface 12*b* of piston 12 and the walls of cylinder 11 through the port 16.

In the illustrated example, the flow of hydraulic fluid into port 15 is controlled by a timer. The volume of hydraulic fluid required to move the piston 12 between its fully extended and fully retracted configurations is known, and hence with knowledge of the flow rate of the hydraulic pump, the time required to return the piston 12 to its retracted position may be calculated.

Alternatively, another proximity sensor may be provided to detect the position of the drive plate 4 relative to the housing 5 or the piston head 13 relative to the housing 10. The change in status of such a proximity sensor would change the direction of flow of hydraulic fluid.

The drive plate 4 is therefore cycled back and forth without the need for the operator to do anything other than depress an actuator which activates the hydraulic pump. The control of direction of flow is controlled electronically according to the output of the proximity sensor 20 and the timer described above. A relatively low hydraulic fluid pressure can be used to cycle the drive plate back and forth until the point where the socket 7 needs to tighten the fastener it is connected to.

The fastener to which the socket 7 is attached is tightened to the required torque when the drive plate 4 does not move with the hydraulic fluid pressure set to match the desired torque. This absence of movement of the drive plate is detected by the signal from the proximity switch. When the fastener is tight, the drive plate 4 will stop moving and hence will not come to the position showing FIG. 1.

Figure 3:
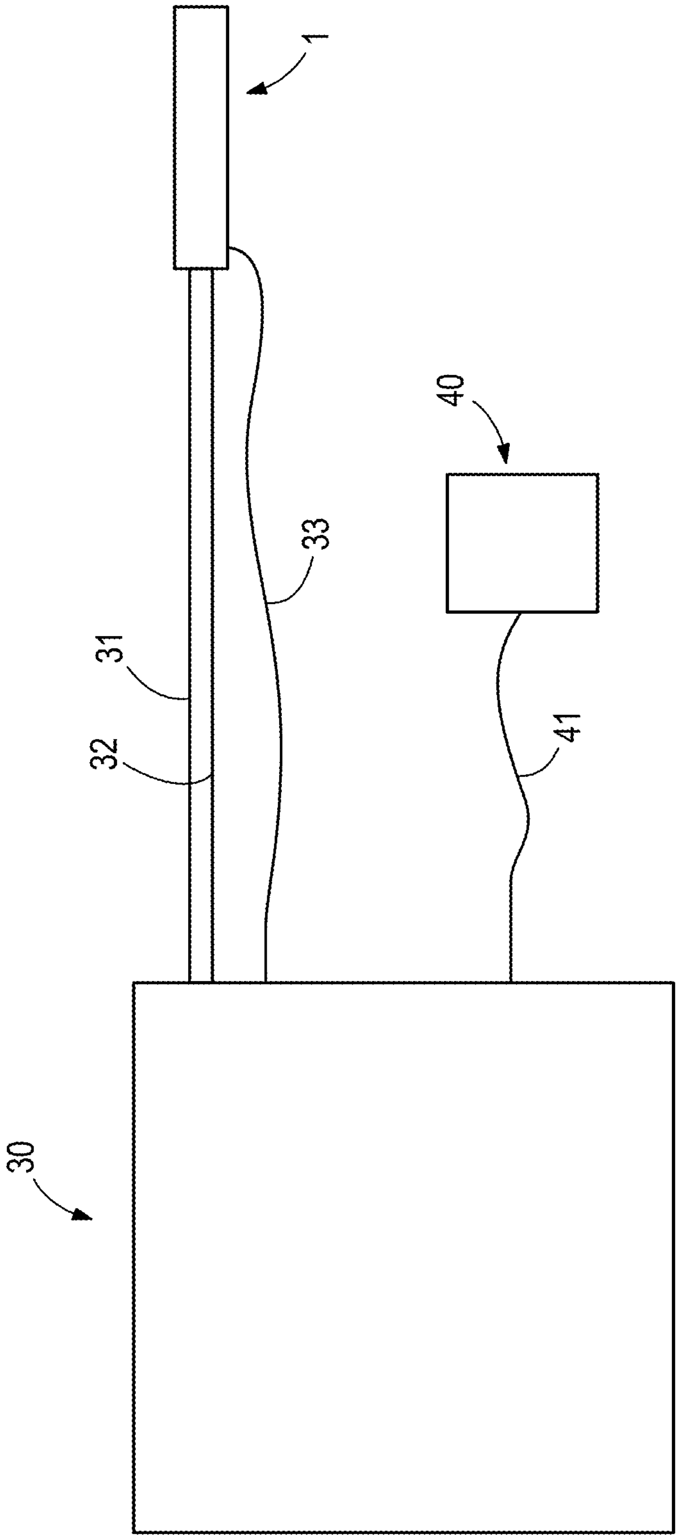
FIG. 3 is a block diagram of a system including the hydraulic torque wrench of FIGS. 1 and 2 with hydraulic power and control components.

Referring now to FIG. 3, the hydraulic torque wrench 1 is connected both hydraulically and electrically to a hydraulic power pack 30 by means of hydraulic hoses 31, 32 and electrical cable 33. A control device 40 is connected electrically to the hydraulic power pack 30 by means of electrical cable 41.

Figure 4:
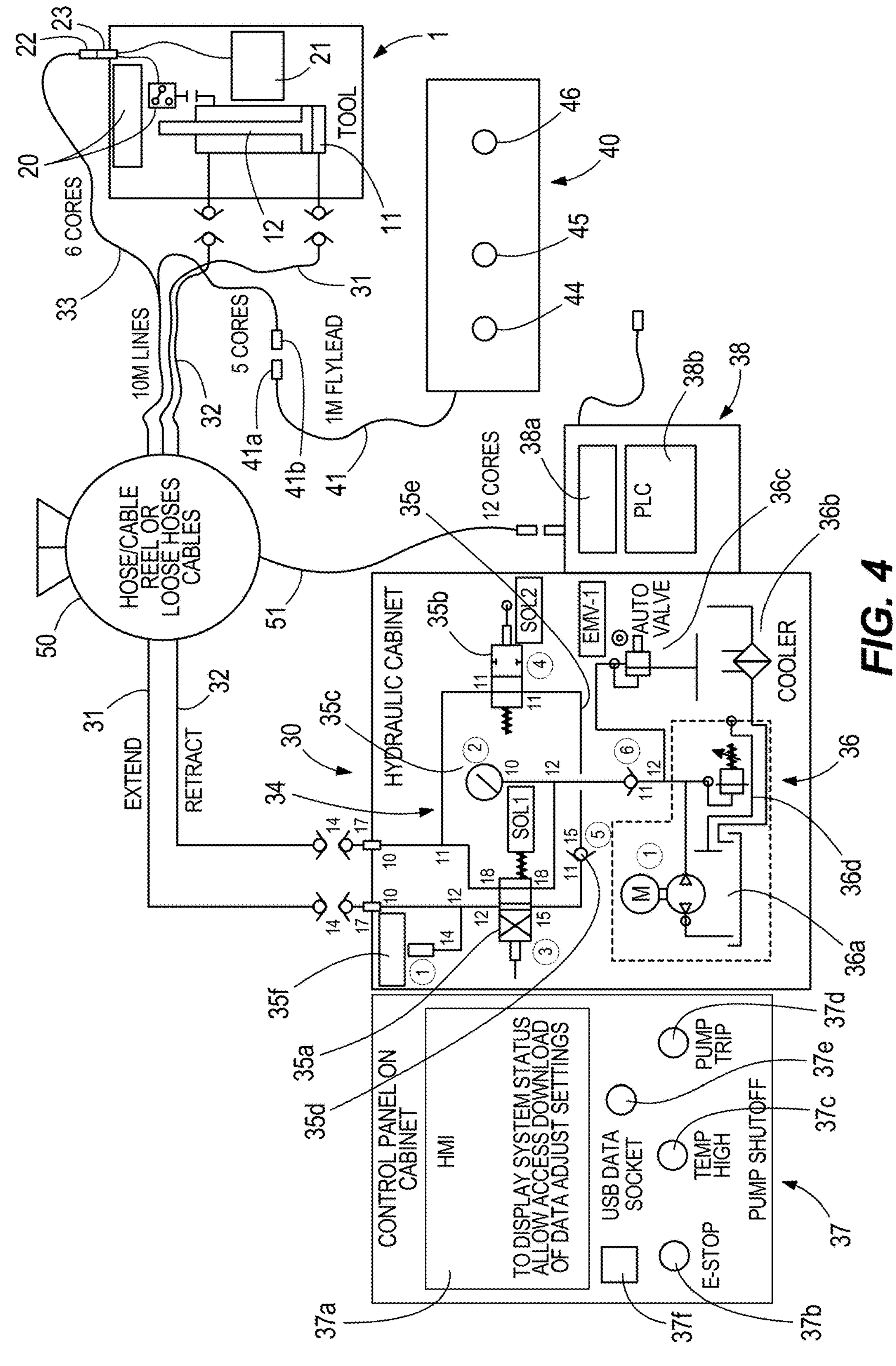
FIG. 4 shows the system of FIG. 3 in detail.

FIG. 4 illustrates the components illustrated in FIG. 3 in detail. The hydraulic power pack 30 comprises a set of components 36 for generating pressurised hydraulic fluid, including a pump unit 36*a* (which includes an electric motor), a cooler 36*b*, a proportional pressure limiting valve 36*c* and a pressure relief valve 36*d*. The set components 36 provide pressurised hydraulic fluid which is directed to the hydraulic torque wrench 1 by a hydraulic circuit 34 which includes a solenoid operated valve 35*a*. In one configuration of the hydraulic circuit 34 pressurised hydraulic fluid is directed to the hydraulic torque wrench 1 via hydraulic hose 31, the hydraulic fluid returning through hydraulic hose 32, through solenoid operated valve 35*b*, which is open, and via port 35*e* to the cooler 36*b*. In the other configuration of the hydraulic circuit 34 the solenoid valve 35*b* is closed and solenoid operated valve 35*a* is closed. Pressurised hydraulic fluid is directed to the hydraulic torque wrench 1 via hydraulic hose 32 causing the piston 12 to retract, the hydraulic fluid returning through hydraulic hose 31, through solenoid operated valve 35*a*, through the non-return valve 35*d* and via port 35*e* to the cooler 36*b*. The hydraulic circuit 34 is provided with a pressure gauge 35*c*.

The cooler 36*b* may include a temperature sensor and a fan, the temperature sensor being configured to detect when the hydraulic fluid temperature exceeds a threshold temperatures, for example 20 C and cause the fan to operate to keep the hydraulic fluid temperature below a second threshold temperature, for example 30 C.

An electronic controller 38 is connected to various components of the set of components 36 and the hydraulic circuit 34, as described below. The controller 38 includes a processor 38 and a programmable logic controller 38*b*. The function of the controller 38 is to set the components to which it is connected so that hydraulic fluid is supplied at the correct pressure and flow rate to the particular tool 1 being used.

The controller 38 is connected electrically to the control device 40 and the hydraulic torque wrench 1. The electrical connection to the hydraulic torque wrench includes one connection to the proximity switch 20 and a second to a microchip 21. The micro chip 21 carries information that identifies the connected hydraulic torque wrench and the parameters of operation thereof. The PLC 38*b* then sets the proportional pressure limiting valve 36*c* to match the requirements of the connected hydraulic torque wrench 1. The electrical connections to the controller 40 and the hydraulic torque wrench 1, namely the electrical cables 33 and 41 are provided within a single cable 51 which includes both electrical cables 33 and 41.

The control device 40 includes trigger 44 for operating the hydraulic torque wrench, emergency stop 45 and indicator light 46.

The hydraulic hoses 31, 32 and electrical cables 33, 41 may be attached to a reel 50, which provides for convenient storage of the hoses and cables.

The hydraulic cabinet is also provides with a human machine interface 37, which includes touch screen display 37*a*, a data logger 37*f*, an emergency stop 37*b*, a hydraulic fluid high temperature indicator 37*c* (which illuminates when the hydraulic fluid temperature exceeds the threshold temperature), a pump trip switch 37*d* and a socket 37*e*, which is a USB data socket in the illustrated example, for connection to other computer devices for example and which allows data recorded on the data logger to be exported from the data logger.

Figure 5:
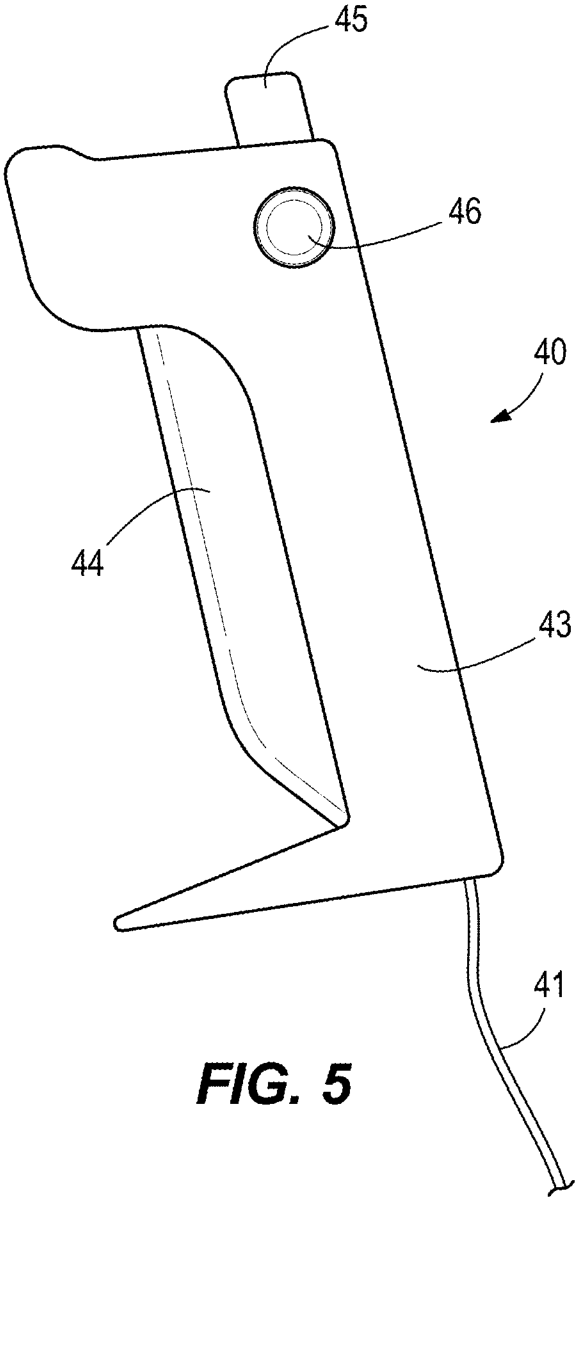
FIG. 5 is a schematic representation of a hand held control device.
Figure 6:
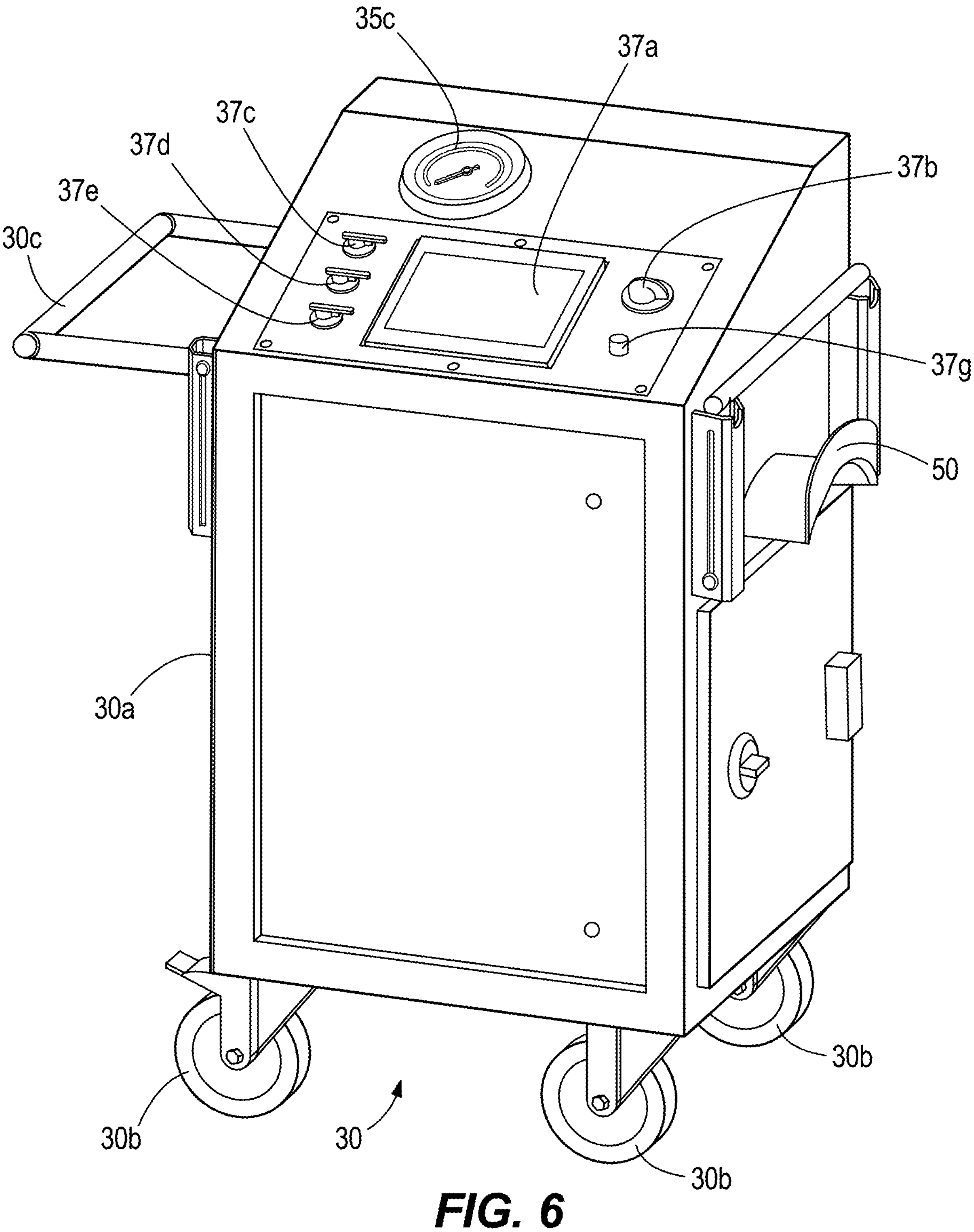
FIG. 6 is a schematic representation of a hydraulic power pack.

FIG. 5 illustrates the embodiment of the control device 40 as a pistol grip hand held device comprising a housing 43 providing a hand grip and mounting a trigger 44, which is moved towards the housing 43 to cause the hydraulic power pack 30 to send pressurised hydraulic fluid to the hydraulic torque wrench 1. The electrical cable 41 enters the housing 43 through the base thereof. The housing also mounts an emergency stop button 45 and an indicator light 46.

In operation, when the hydraulic torque wrench 1 is connected to the controller 38 by cable 33, the identity of the hydraulic torque wrench 1 is read and the required settings for the hydraulic pump 36*a* are downloaded from a database of settings. With the apparatus configured for the connected hydraulic torque wrench, depressing the trigger 44 initiates cycling of the piston 12 within the cylinder 11 begins. Each time the piston is extended such that the surface 4*b* of the drive plate 4 becomes proximate the proximity sensor 20 the direction of flow of hydraulic fluid in the hoses 31, 32 is reversed to return the piston 12 to its retracted position in cylinder 11. Cycling of the piston runs down the fastener to which the hydraulic torque wrench is connected to a point where the fastener begins to tighten. Cycling of the piston continues while the trigger 44 is depressed and until the surface 4*b* of the ratchet drive does not become proximate the proximity sensor, which indicates that the fastener is tight.

The PLC 38*b* is programmed so that hydraulic fluid is pumped into the space defined by the cylinder 11 and the upper surface of the piston 12*a* such that the piston retract time is a short period, for example 0.5 seconds.

The PLC 38*b* is programmed so that a torque achieved time, which may be 5 seconds, is required before torque achieved lamp on the control device 40 is illuminated.

The PLC 38*b* is programmed with a pump idle time which switches off the motor/pump 38*a* when the pump has been idling for a period of time, which may be 5 seconds.

The PLC 38*b* is programmed with a pressure required not reached time. This may be set at 7 seconds. If the required hydraulic fluid pressure as sensed by the hydraulic fluid pressure sensor 35*f* is not reached for the time period, the duty cycle of the pump 38*a* is increased to increase the hydraulic fluid pressure.

The PLC 38*b* is programmed with a duty cycle increase rate. An increase in the duty cycle is required where the required pressure is not reached. The duty cycle increase rate is set at 3 seconds. This means that if a duty cycle increase rate is required because the required pressure has not been reached, the duty cycle is increased and the pump is operated at that increased duty cycle for a period of 3 seconds before the duty cycle is increased again, if the required pressure is still not reached.

The apparatus of the invention allows fasteners to be set to a torque automatically, with the operator needing only to operate an on/off switch and without the requirement to watch for rotation fo the fastener whilst also watching a pressure dial. Furthermore, the apparatus may use less energy because it is not necessary to operate at full hydraulic pressure until the fastener starts to tighten.

The invention claimed is:

1. A combination of a hydraulic torque wrench and a hydraulic power pack, the combination comprising:

the hydraulic torque wrench having a ratchet link including a socket for engaging with a fastener and a ratchet lever that is configured to rotate the socket to tighten the fastener, a power head including a piston that is coupled to the ratchet lever such that movement of the piston causes the ratchet lever to rotate the socket, and a proximity sensor configured to detect a presence of the ratchet lever, the hydraulic power pack having a hydraulic pump and a hydraulic circuit configured cycle the piston by alternately providing a pressurized hydraulic fluid to opposite sides of the piston, and a controller communicatively coupled to the proximity sensor and being configured to control the hydraulic power pack, wherein the controller is further configured to cause the hydraulic power pack to stop cycling the piston when the proximity sensor does not detect the presence of the ratchet lever within a predetermined time.

2. The combination according to claim 1, wherein the controller includes a data logger configured to record a previous torque applied when the proximity sensor does not detect the presence of the ratchet lever within the predetermined time.

3. The combination according to claim 1, wherein the controller includes a data logger configured to record identifying information of the hydraulic torque wrench.

4. The combination according to claim 1, wherein the controller includes a data logger configured to record identifying information associated with an object on which the hydraulic torque wrench is being used.

5. The combination according to claim 1, wherein the piston is configured to move linearly and the ratchet lever is configured to rotate based on movement of the piston.

6. The combination according to claim 5, further comprising an attachment means configured to take up relative movement between the piston and the ratchet lever as the piston moves linearly and the ratchet lever rotates.

7. The combination according to claim 6, wherein the attachment means includes a pin and a slot.

8. The combination according to claim 1, wherein the ratchet link includes a housing for the ratchet lever and wherein the proximity sensor is coupled to the housing.

9. The combination according to claim 1, wherein the hydraulic torque wrench includes an electronic identifier having identifying information selected from the group consisting of a tool serial number, a tool type, a required tool operating pressure, and a pressure torque ratio, and further wherein the controller is configured to set a hydraulic pressure of the hydraulic power pack based on the identifying information from the electronic identifier.

10. The combination according to claim 1, wherein the hydraulic power pack includes a hydraulic pressure sensor configured to sense a fluid pressure in the hydraulic circuit, and wherein the controller is configured to increase a duty cycle of the hydraulic pump based on the fluid pressure.

11. The combination according to claim 1, wherein the hydraulic power pack includes a hydraulic fluid cooler.

12. The combination according to claim 11, wherein the hydraulic power pack includes a temperature sensor configured to sense a temperature of the pressurized hydraulic fluid, and a wherein the controller is configured to operate the hydraulic fluid cooler based on the temperature.

13. The combination according to claim 1, further comprising a control device configured to cause the hydraulic power pack to cycle the piston when the proximity sensor detects the presence of the ratchet lever.

14. The combination according to claim 13, wherein the control device is a hand-operated control device.

15. The combination according to claim 13, wherein the control device includes an on/off switch having an on position in which the hydraulic power pack cycles the piston and an off position in which the hydraulic power pack does not cycle the piston.

16. The combination according to claim 13, further comprising an indicator configured to indicate that a required torque has been reached when the proximity sensor does not detect the presence of the ratchet lever within the predetermined time.

17. A method of operating the combination according to claim 13, comprising connecting the hydraulic torque wrench to an apparatus having the fastener and operating the control device to initiate cycling of the piston, continuing cycling of the piston when the proximity sensor detects the presence of the ratchet lever, and then automatically stopping cycling of the piston via the controller when the proximity sensor does not detect the presence of the ratchet lever within the predetermined time.

18. The method according to claim 17, further comprising indicating that a required torque has been reached when the proximity sensor does not detect the presence of the ratchet lever within the predetermined time.

19. A combination of a hydraulic torque wrench and a hydraulic power pack, the combination comprising:

the hydraulic torque wrench having a ratchet link including a socket for engaging with a fastener and a ratchet lever that is configured to rotate the socket to tighten the fastener, a power head including a piston that is coupled to the ratchet lever such that movement of the piston causes the ratchet lever to rotate the socket, and a proximity sensor configured to detect a presence of the ratchet lever, the hydraulic power pack having a hydraulic pump and a hydraulic circuit configured cycle the piston by alternately providing a pressurized hydraulic fluid to opposite sides of the piston, a controller configured to control the hydraulic power pack and is communicatively coupled to the proximity sensor, wherein the controller is configured to cause the hydraulic power pack to stop cycling the piston when the proximity sensor does not detect the presence of the ratchet lever within a predetermined time, and a control device configured to cause the hydraulic power pack to cycle the piston when the proximity sensor detects the presence of the ratchet lever, wherein operation of the control device causes the hydraulic power pack to continue cycling of the piston as long as the proximity sensor detects the presence of the ratchet lever within a predetermined time.

20. The combination according to claim 19, further comprising an indicator device configured to indicate that a required torque has been reached when the proximity sensor does not detect the presence of the ratchet lever within the predetermined time.

* * * * *